United States Patent [19]

Salvador et al.

[11] 4,309,194

[45] Jan. 5, 1982

[54] PARTICLE WITHDRAWAL FROM FLUIDIZED BED SYSTEMS

[75] Inventors: Louis A. Salvador, Greensburg, Pa.; Ronald E. Andermann, Arlington Heights, Ill.; Lawrence K. Rath, Mt. Pleasant, Pa.

[73] Assignee: The United States of America as represented by the United States Department of Energy, Washington, D.C.

[21] Appl. No.: 156,000

[22] Filed: Jun. 3, 1980

[51] Int. Cl.$^3$ ............................................. C10J 3/68
[52] U.S. Cl. ............................................. 48/76; 48/77; 48/63; 48/203; 48/210; 414/147; 422/110; 422/145; 110/185; 110/266
[58] Field of Search ............... 422/110, 145, 139; 48/210, 209, 197 R, 203, 73, 206, 77, 76, 87, 111, 62 R, 63, 64; 414/147, 148; 406/28; 110/165, 167, 190, 266, 185

[56] References Cited

U.S. PATENT DOCUMENTS

| | | | |
|---|---|---|---|
| 2,118,651 | 5/1938 | Macchi | 110/165 R |
| 2,534,051 | 12/1950 | Nelson | 202/6 |
| 2,557,842 | 6/1951 | Ruthruff | 422/139 |
| 2,677,604 | 5/1954 | Nelson | 48/206 |
| 2,985,525 | 5/1961 | Bearer | 422/110 |
| 3,847,563 | 11/1974 | Archer et al. | 48/77 |
| 3,981,690 | 9/1976 | Chen et al. | 48/73 |

FOREIGN PATENT DOCUMENTS 694350  7/1953  United Kingdom ............... 110/190

OTHER PUBLICATIONS

Westinghouse Electric Corp., "Advanced Coal Gasification System for Electric Power Generation", 8/15/77.

*Primary Examiner*—S. Leon Bashore
*Assistant Examiner*—Michael Goldman
*Attorney, Agent, or Firm*—Edward L. Levine; Z. L. Dermer

[57] ABSTRACT

Method and apparatus for removing ash formed within, and accumulated at the lower portion of, a fluidized bed coal gasification reactor vessel. A supplemental fluidizing gas, at a temperature substantially less than the average fluidized bed combustion operating temperature, is injected into the vessel and upwardly through the ash so as to form a discrete thermal interface region between the fluidized bed and the ash. The elevation of the interface region, which rises with ash accumulation, is monitored by a thermocouple and interrelated with a motor controlled outlet valve. When the interface rises above the temperature indicator, the valve opens to allow removal of some of the ash, and the valve is closed, or positioned at a minimum setting, when the interface drops to an elevation below that of the thermocouple.

6 Claims, 1 Drawing Figure

U.S. Patent     Jan. 5, 1982     4,309,194
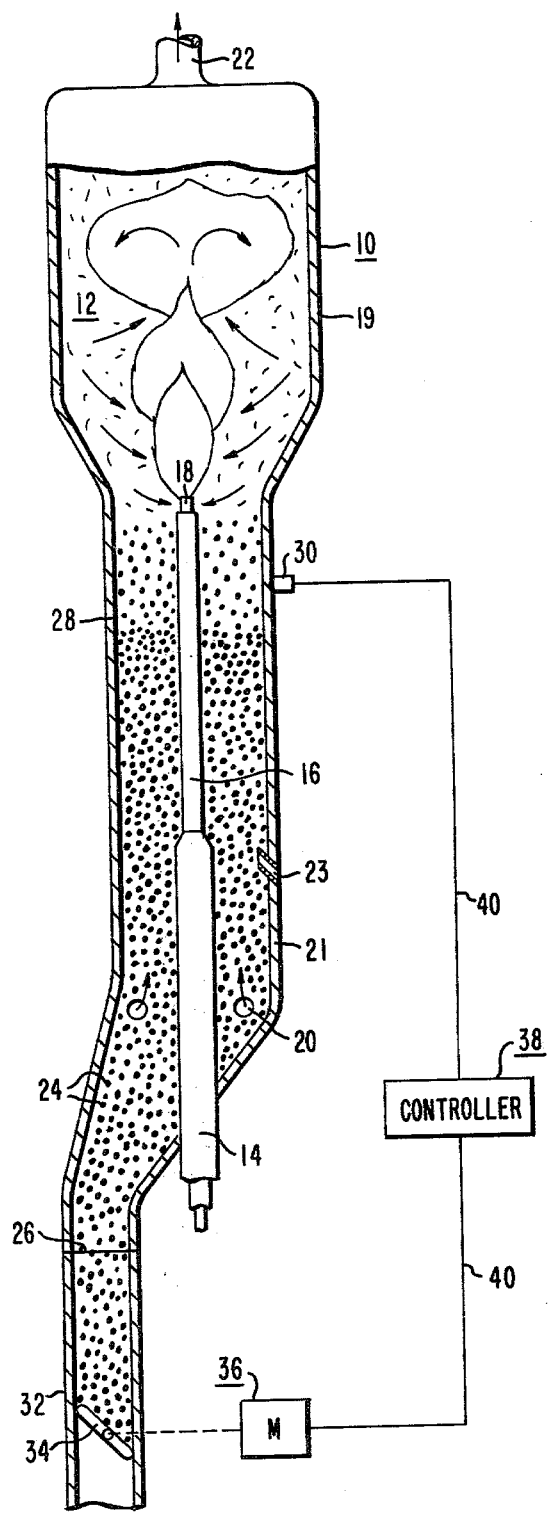

PARTICLE WITHDRAWAL FROM FLUIDIZED BED SYSTEMS

GOVERNMENT CONTRACT

This invention was made or conceived in the course of, or under, a contact with the United States Government as represented by the United States Department of Energy.

BACKGROUND OF THE INVENTION

1. Field of the Invention

This invention relates to the removal of solid products from a fluidized bed, particularly applicable to beds combusting carbonaceous material such as coals and char to form a product gas and agglomerated ash.

2. Description of the Prior Art

There is increased emphasis being placed upon systems which transform materials such as coal into other useful fuel forms, such as systems for coal liquifaction and gasification. Among such processes are those utilizing fluidized beds into which are fed particles of coal, or a coal derivative such as char or coke breeze to form a combustible product gas and product solids, primarily agglomerated ash particles with some char.

As the devolatization, combustion or other reaction takes place within the fluidized bed, the product or waste solids tend to congregate at the bottom of the containing vessel as a result of various operational phenomena such as agglomeration, and must be removed. It is known that various operational parameters can be adjusted to control the rate and degree of ash agglomeration and separation, such as the combustion operating temperature, the feed rates of various inlet gases and coal particles, and the type and size of particle initially fed into the bed. To the extent that these parameters can be adjusted to control ash formation, their adjustment indirectly represents one method of ash removal from the bed. Such adjustments are discussed in U.S. Pat. No. 3,981,690. Another manner in which to control ash removal is to adjust the flow rate of the gas, entering at the lower end of the containing vessel through a constriction such as a venturi, such that the heavier or denser agglomerated ash particles will overcome the resistance to downward motion provided by the gas, while lighter or less dense particles will remain above.

Another method of ash removal control is, as described in U.S. Pat. Nos. 2,534,051 and 2,677,604, to maintain the top level of a fluidized bed within a selected range. As the top reaches a prescribed upper level, a valve responds to allow removal of particles from the fluidized bed reactor.

While such control and removal techniques are functional, improvements can be made. For example, the venturi technique may be highly sensitive to changes in operational parameters, and control by upper level monitoring can be difficult since the level may not always be well defined. Additionally, the upper level is not necessarily representative of the amount of solid product buildup.

It therefore is desirable to provide alternate systems for withdrawal of solid products from fluidized bed reactors which preferably are accurate, automatic and simple in concept and structure.

SUMMARY OF THE INVENTION

This invention provides a system for controlled removal of product solids in a fluidized bed reactor system, particularly useful in the removal of agglomerated ash or char in a reactor receiving a carbonaceous feed material such as particulate coal. In a preferred exemplary coal gasification system a flow of relatively cold gas is fed upwardly through accumulated ash and into the combusting fluidized bed so as to enhance the formation of a substantially discrete temperature interface zone above which hotter particles are being fluidized, devolatized, gasified or combusted, and below which cooler product particles tend to separate from the hotter particles making up the bulk of the fluidized bed and to congregate.

A temperature indicating device, such as one or more thermocouples, is mounted to the vessel containing the fluidized bed in the elevational region where it is desired that the interface be maintained. At the bottom of the vessel is an outlet connected to a conduit which can include a starwheel, screw or other type of valve, for removal of the product ash. The opening and closing of the outlet or associated valve is preferably controlled by a driver, such as a motor.

Indicating signals from the thermocouple are provided to a preset controller which responds, dependent upon its setting, to open or close the outlet, allowing removal of the ash. When the thermocouple indicates "hot", the ash content within the vessel is low, the interface region is below the thermocouple and the outlet remains closed or at a minimum opening. When the thermocouple indicates "cold", the ash content is high, the interface region is above the thermocouple elevation, and the controller opens the outlet to remove ash until a "hot" signal is received.

BRIEF DESCRIPTION OF THE DRAWING

The advantages, nature and additional features of the invention will become more apparent from the following description, taken in connection with the accompanying sole FIGURE, which shows application of the inventive system to an exemplary fluidized bed coal gasification reactor.

DESCRIPTION OF THE PREFERRED EMBODIMENTS

Referring now to the FIGURE there is shown an exemplary coal gasification reactor vessel 10 housing, during operation, a gasifying fluidized or slugging bed 12. Injected into the vessel 10 to form the fluidized bed 12 are several mediums including a solid, carbonaceous, combustible material in the form of particulates or fines, such as lignite, peat and coal, char or coke breeze, carried in a transport gas. Also introduced are a combustion gas, such as air or other oxygen containing mediums, and a first fluidizing gas such as steam or recycled product gas which also assists the conversion process. These mediums can be injected from various inlets, including an inlet 14 which can comprise a plurality of conduits 16, 18 arranged concentrically or otherwise.

In the exemplary system the mediums flow generally upwardly through inlet 14, and are reacted initially in the upper enlarged section 19 of the vessel. Additional fluidizing gas can also be introduced at selected elevations, such as through a manifold 20 at the lower section 21 of the vessel.

During the gasifying-combustion reaction process, a product gas is produced and discharged through a gas outlet 22. Also produced are product solids, such as agglomerated ash 24, which tend to flow downwardly about the inlet conduits and accumulate at the lower portion of the vessel 10 as a result of a required higher fluidization velocity due to the increased size and density of the ash. The agglomerated ash 24 is selectively removed from the vessel 10 through an outlet 26, in a manner described more fully hereinafter. A supplemental fluidizing gas is injected into the vessel 10 in a generally upward direction through the manifold 20 or alternate inlet means such as inwardly extending conduits 23. This supplemental fluidizing gas, which can comprise, for example, nitrogen, carbon dioxide, superheated steam or recycled product gas from the ongoing process, is preferably injected at an elevation low in the vessel, above which some agglomerated product ash will always be present. The fluidizing gas is injected at a temperature which is lower than the average temperature of the well mixed fluidized bed 12, and preferably this temperature differential is at least 500° F. Typical of the average fluidized bed temperature and the supplemental gas injection temperature are respectively 1850° F. and 500° F. for an exemplary fifteen ton per day gasification reactor. This cooler supplemental fluidizing gas acts to further separate the well mixed fluidized bed 12 from the agglomerated ash due to differences in minimum fluidization velocities among the particles of coal and char making up the bulk of the fluidized bed and the larger, more dense ash agglomerates in the annular area surrounding the inlet tube 14. The separation also forms a temperature interface region 28, above which the temperature can be described as hot, approximately 1800° F., and below which the temperature can be described as cold, approximately 600° F. to 1000° F. The interface 28 is generally discrete, being approximately two to twelve inches thick in the exemplary reactor system, and rises and falls with the accumulation and removal of ash. The exemplary coal gasification fluidized bed will, without the supplemental fluidizing gas, form separate fluidized and non-fluidized regions. The added, cooler fluidized gas, however, acts to provide the more discrete temperature interface region 28, thus allowing product removal control as described herein.

To remove the product ash in an automatic, controlled fashion, one or more temperature indicating means such as a fixed probe or thermocouple 30, is located at a preselected elevation corresponding generally to the maximum ash accumulation level desired. A plurality of thermocouples at selected elevations can also be advantageously utilized. Located at the lower outlet 26, or in a conduit 32 associated with the outlet 26, is a device selectively operable to open or close and, correspondingly, allow removal or accumulation of the product ash within the vessel 10. The device can also be set at a preselected minimum opening during normal operation, and the degree to which the device is opened can be modulated as desired for any specific gasification system. The device is preferably a valve 34, of the starwheel or screw type, operated by a motor 36. The motor driven valve 34 and the temperature indicating thermocouple 30 are interrelated by control means, well known in the art, such as a controller 38 and electrical leads 40.

During operation, the temperature interface 28 is disposed, for example, below the thermocouple elevation. Under this condition the thermocouple is exposed to a "hot" temperature indicative of the fluidized bed 12, and correspondingly signals the controller 38 which maintains the valve 34 in a closed, or minimally open orientation. As particulate solids are fed into the vessel and gasification progresses, the product ash accumulates in the lower section 21 of the vessel 10 and eventually the temperature interface region 28 rises to a level above the thermocouple elevation. Under this condition the thermocouple is exposed to a "cold" temperature indicative of the accumulated ash 24, and correspondingly signals the controller 38. The controller, for example, compares the thermocouple signal to a preselected set point and responds to the "cold" temperature indication to open or further open, the valve 34. The valve 34 now operates to remove the product ash from the vessel 10 and thus lower the temperature interface region 28. Removal continues until the interface region 28 falls to a selected elevation, below the elevation of the thermocouple 28, which is then again exposed to a "hot" temperature. The controller then stops the ash removal until the interface region once again rises to an elevation above the thermocouple 30.

Many modifications of the disclosed solid product withdrawal system are possible without departing from the spirit and scope thereof. For example, a plurality of temperature indicating devices, located at differing elevations, can be utilized in conjunction with a variable speed motor operated valve. When the interface 28 is at an upper elevation the controller 38 can be arranged to signal for a higher withdrawal rate than the rate as the ash inventory drops to selectively lower elevations. Thus, the interface would drop below several selected elevations prior to the removal being entirely halted, or reduced to a minimum. Additionally, an upper temperature indicator elevation can be monitored to provide an "open" signal, and a separate lower temperature indicator position can be monitored to provide a "close" signal. Plural elevation monitoring can avoid excessive cycling of the system. Additional modifications are also possible. It is therefore intended that all matter contained in the foregoing description be interpreted as illustrative, and not in a limiting sense.

We claim:

1. In a system wherein coal particles are fed into a vertically disposed vessel housing a fluidized bed formed from injection of said coal particles and a first fluidizing gas, to form a combustible product gas and agglomerated ash, said agglomerated ash tending to congregate at a lower portion of said vessel, improved apparatus for removing said agglomerated ash from said vessel, comprising:
   a. means for injecting a supplemental fluidizing gas into said vessel at a preselected elevation and at a temperature less than the average operating temperature of said fluidized bed so as to form a substantially discrete temperature interface region above said preselected elevation between said agglomerated ash and said fluidized bed;
   b. temperature sensitive means for indicating the elevational position of said interface region; and
   c. means responsive to the indication of said temperature sensitive means for selectively removing some of said agglomerated ash from said vessel.

2. The system of claim 1 wherein said temperature sensitive means includes a fixed probe which indicates the elevational position of said interface region relative to said probe.

3. The system of claim 1 wherein said injection means comprises an inlet disposed in said lower portion of said vessel and oriented to inject said supplemental fluidizing gas into said agglomerated ash in a generally upward direction.

4. The system of claim 3 wherein said means for injecting supplemental fluidizing gas comprises a manifold containing gas at a temperature at least 500° F. less than the average temperature of said fluidized bed.

5. In a system wherein coal particles are fed into a vertically disposed vessel housing a fluidized bed formed from injection of said coal particles and a first fluidizing gas, to form a combustible product gas and agglomerated ash, said agglomerated ash tending to congregate at a lower portion of said vessel, improved apparatus for removing said agglomerated ash from said vessel, comprising:

a. means for injecting a supplemental fluidizing gas into said vessel at a preselected elevation and at a temperature at least 500° F. less than the average operating temperature of said fluidized bed so as to form a substantially discrete temperature interface region above said preselected elevation between said agglomerated ash and said fluidized bed, said interface region separating the mediums in said vessel into solids above said interface at a hot temperature and agglomerated ash below said interface at a cooler temperature;

b. temperature sensitive means fixedly disposed at a selected elevation of said vessel for indicating said hot temperature and said cooler temperature; and c. means responsive to said temperature sensitive means indicating said cooler temperature for selectively removing some of said agglomerated ash from said vessel.

6. In a process wherein coal particles are fed into a vertically disposed vessel housing a fluidized bed formed from injection of said coal particles and a first fluidizing gas, to form a combustible product gas and agglomerated ash, said agglomerated ash tending to congregate at a lower portion of said vessel, an improved method for removing said agglomerated ash from said vessel, comprising:

a. injecting a supplemental fluidizing gas into said vessel at a preselected elevation and at a temperature less than the average operating temperature of said fluidized bed so as to form a substantially discrete temperature interface region above said preselected elevation between said agglomerated ash and said fluidized bed;

b. thermally monitoring the elevational position of said interface region; and c. selectively removing some of said agglomerated ash from said vessel in response to said thermal monitoring.

* * * * *